United States Patent
Shu et al.

(10) Patent No.: US 9,229,642 B2
(45) Date of Patent: Jan. 5, 2016

(54) READ DISTURB HANDLING IN NAND FLASH

(71) Applicant: LSI Corporation, San Jose, CA (US)

(72) Inventors: Nanshan Shu, Shanghai (CN); Peng Xu, Shanghai (CN); Zhimin Dong, Shanghai (CN); Yingyi Ju, Shanghai (CN); Jiangang Wu, Shanghai (CN)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 146 days.

(21) Appl. No.: 14/243,098

(22) Filed: Apr. 2, 2014

(65) Prior Publication Data

US 2015/0268871 A1    Sep. 24, 2015

(30) Foreign Application Priority Data

Mar. 19, 2014  (CN) .......................... 2014 1 0101788

(51) Int. Cl.
*G06F 12/00* (2006.01)
*G06F 3/06* (2006.01)

(52) U.S. Cl.
CPC ............ *G06F 3/0616* (2013.01); *G06F 3/0655* (2013.01); *G06F 3/0679* (2013.01); *G06F 2206/1014* (2013.01)

(58) Field of Classification Search
CPC ..... G06F 3/0616; G06F 3/0679; G06F 3/0655; G06F 2206/1014
See application file for complete search history.

(56) References Cited

U.S. PATENT DOCUMENTS

| | | | |
|---|---|---|---|
| 7,818,525 B1 | 10/2010 | Frost et al. ..................... | 711/165 |
| 7,937,521 B2 | 5/2011 | Reid .............................. | 711/100 |
| 8,190,842 B2 * | 5/2012 | Frost ................... | G06F 12/0246 |
| | | | 365/185.25 |
| 8,380,915 B2 | 2/2013 | Wood et al. ................... | 711/100 |
| 8,930,778 B2 * | 1/2015 | Cohen ................. | G06F 11/2094 |
| | | | 711/165 |
| 2010/0107021 A1 | 4/2010 | Nagadomi et al. ............ | 714/704 |
| 2011/0119431 A1 | 5/2011 | Chowdhury .................. | 711/103 |
| 2011/0283136 A1 * | 11/2011 | Edwards ............... | G06F 9/4403 |
| | | | 714/6.11 |
| 2015/0113341 A1 * | 4/2015 | Frost ................... | G06F 12/0246 |
| | | | 714/704 |

* cited by examiner

*Primary Examiner* — John Lane

(57) ABSTRACT

An apparatus having a processor and an interface to a nonvolatile memory having a plurality of blocks is disclosed. The processor is configured to (i) monitor a number of reads since a respective erase in at least one of the blocks in the nonvolatile memory, (ii) move a page from a first block to a second block in response to the number of reads exceeding a first threshold where the first block is partially programmed and (iii) move the page from the first block to the second block in response to the number of reads exceeding a second threshold where the first block is fully programmed. The first threshold is less than the second threshold.

18 Claims, 5 Drawing Sheets

READ DISTURB HANDLING IN NAND FLASH

This application relates to Chinese Application No. 201410101788.5, filed Mar. 19, 2014, which is hereby incorporated by reference in its entirety.

FIELD OF THE INVENTION

The invention relates to flash control generally and, more particularly, to a method and/or apparatus for implementing read disturb handing in NAND flash.

BACKGROUND

Where data is programmed in a NAND flash, a frequency of reading individual pieces of the data varies from each other. Some data is read frequently by the host, such as a popular video data server. Furthermore, map data between physical addresses used internal to the flash and logical addresses used external to the flash is read frequently by firmware in truly random read cases, such as an application in an enterprise data center. The frequently read host data and map data are referred to as hot read data.

SUMMARY

The invention concerns an apparatus having a processor and an interface to a nonvolatile memory having a plurality of blocks. The processor is configured to (i) monitor a number of reads since a respective erase in at least one of the blocks in the nonvolatile memory, (ii) move a page from a first block to a second block in response to the number of reads exceeding a first threshold where the first block is partially programmed and (iii) move the page from the first block to the second block in response to the number of reads exceeding a second threshold where the first block is fully programmed. The first threshold is less than the second threshold.

BRIEF DESCRIPTION OF THE FIGURES

Embodiments of the invention will be apparent from the following detailed description and the appended claims and drawings in which:

DETAILED DESCRIPTION OF THE EMBODIMENTS

Embodiments of the invention include providing read disturb handing in NAND flash that may (i) reduce frequency of block refreshes due to hot read pages, (ii) account for differences between fully programmed and partially programmed blocks and/or (iii) be implemented as one or more integrated circuits.

A read disturb phenomenon is an issue for solid-state drive (e.g., SSD) and any other NAND flash based storage devices. The issue appears when the NAND flash is used in certain applications, such as video data server or data center. If the data is read frequently, some of the data written into NAND pages become hot read data. The hot read data can be located in a fully programmed or partially programmed NAND block. The read operation on the pages where the hot read data sit affects the other pages in the same block.

Some embodiments of invention eliminate the read disturb effect on partially programmed NAND blocks. The effect that read disturb introduces on the partially programmed block is poorer than that on fully programmed block, especially on multi-level-cell NAND flash. The hot read data is moved from a current hot block to a different block, and so leverages a read count on different blocks. In various embodiments, the identification and subsequent movement of the hot blocks can be applied in the firmware of most NAND flash-based storage devices, such as solid-state drives and/or embedded multimedia controllers (e.g., eMMC).

Figure 1:
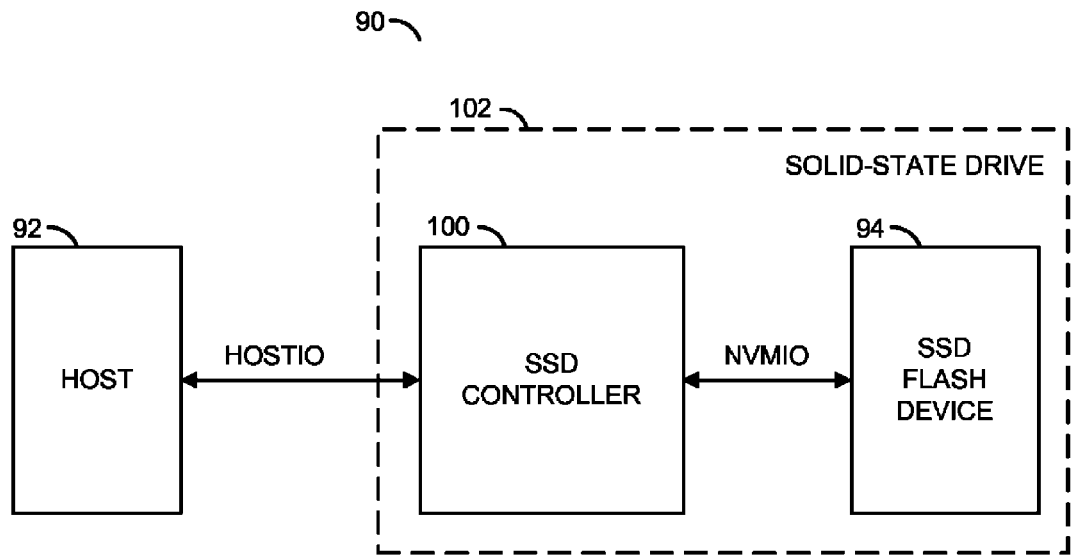
FIG. 1 is a block diagram of an example implementation of an apparatus.

Referring to FIG. 1, a block diagram of an example implementation of an apparatus 90 is shown. The apparatus (or circuit or device or integrated circuit) 90 implements a computer having a nonvolatile memory circuit. The apparatus 90 generally comprises a block (or circuit) 92, a block (or circuit) 94 and a block (or circuit) 100. The circuits 94 and 100 form a drive (or device) 102. The circuits 92 to 102 may represent modules and/or blocks that may be implemented as hardware, software, a combination of hardware and software, or other implementations.

One or more signals (e.g., HOSTIO) are exchanged between the circuit 92 and the circuit 100. The host input/output signal HOSTIO generally includes, but is not limited to, a logical address component used to access data in the circuit 102, a host command component that controls the circuit 102, a write data component that transfers write data from the circuit 92 to the circuit 100 and a read data component that transfers error corrected read data from the circuit 100 to the circuit 92. One or more signals (e.g., NVMIO) are exchanged between the circuit 100 and the circuit 94. The nonvolatile memory input/output signal NVMIO generally includes, but is not limited to, a physical address component used to access data in the circuit 94, a memory command component that controls the circuit 94 (e.g., read or write commands), a write codeword component that carries error correction coded and cyclical redundancy check protected write codewords written from the circuit 100 into the circuit 94 and a read codeword component that carries the error correction coded codewords read from the circuit 94 to the circuit 100.

The circuit 92 is shown implemented as a host circuit. The circuit 92 is generally operational to read and write data to and from the circuit 94 via the circuit 100. When reading or writing, the circuit 92 transfers a logical address value in the signal HOSTIO to identify which set of data is to be written or to be read from the circuit 94. The address generally spans a logical address range of the circuit 102. The logical address can address individual data units, such as SATA (e.g., serial-ATA) sectors.

The circuit 94 is shown implementing one or more nonvolatile memory circuits (or devices). According to various embodiments, the circuit 94 comprises one or more nonvolatile semiconductor devices. The circuit 94 is generally operational to store data in a nonvolatile condition. When data is read from the circuit 94, the circuit 94 accesses a set of data (e.g., multiple bits) identified by the address (e.g., a physical address) in the signal NVMIO. The address generally spans a physical address range of the circuit 94.

In some embodiments, the circuit 94 may be implemented as a single-level cell (e.g., SLC) type circuit. A single-level cell type circuit generally stores a single bit per memory cell (e.g., a logical 0 or 1). In other embodiments, the circuit 94 may be implemented as a multi-level cell type circuit. A multi-level cell type circuit is capable of storing multiple (e.g., two) bits per memory cell (e.g., logical 00, 01, 10 or 11). In still other embodiments, the circuit 94 may implement a triple-level cell type circuit. A triple-level cell circuit stores multiple (e.g., three) bits per memory cell (e.g., a logical 000, 001, 010, 011, 100, 101, 110 or 111). A four-level cell type circuit may also be implemented. The examples provided are based on two bits per cell type devices and may be applied to all other types of nonvolatile memory.

Data within the circuit 94 is generally organized in a hierarchy of units. A block is a smallest quantum of erasing. A page is a smallest quantum of writing. A codeword (or read unit or Epage or ECC-page) is a smallest quantum of reading and error correction. Each block includes an integer number of pages. Each page includes an integer number of codewords.

The circuit 100 is shown implementing a controller circuit. The circuit 100 is generally operational to control reading to and writing from the circuit 94. The circuit 100 includes an ability to decode the read codewords received from the circuit 94. The resulting decoded data is presented to the circuit 92 via the signal HOSTIO and/or re-encoded and written back into the circuit 94 via the signal NVMIO. The circuit 100 comprises one or more integrated circuits (or chips or die) implementing the controller of one or more solid-state drives, embedded storage, or other suitable control applications.

As part of the decoding, the circuit 100 looks up decoding parameters (e.g., the log likelihood ratio values) stored in one or more internal tables. The decoding parameters are used as part of an iterative decoding procedure that attempts to correct any errors that may be present in the codewords. The decoding parameters generally inform the decoding procedure of a reliability for each respective bit of the codewords.

The circuit 102 is shown implementing a solid-state drive. The circuit 102 is generally operational to store data generated by the circuit 92 and return the data to the circuit 92. According to various embodiments, the circuit 102 comprises one or more: nonvolatile semiconductor devices, such as NAND Flash devices, phase change memory (e.g., PCM) devices, or resistive RAM (e.g., ReRAM) devices; portions of a solid-state drive having one or more nonvolatile devices; and any other volatile or nonvolatile storage media. The circuit 102 is generally operational to store data in a nonvolatile condition.

Figure 2:
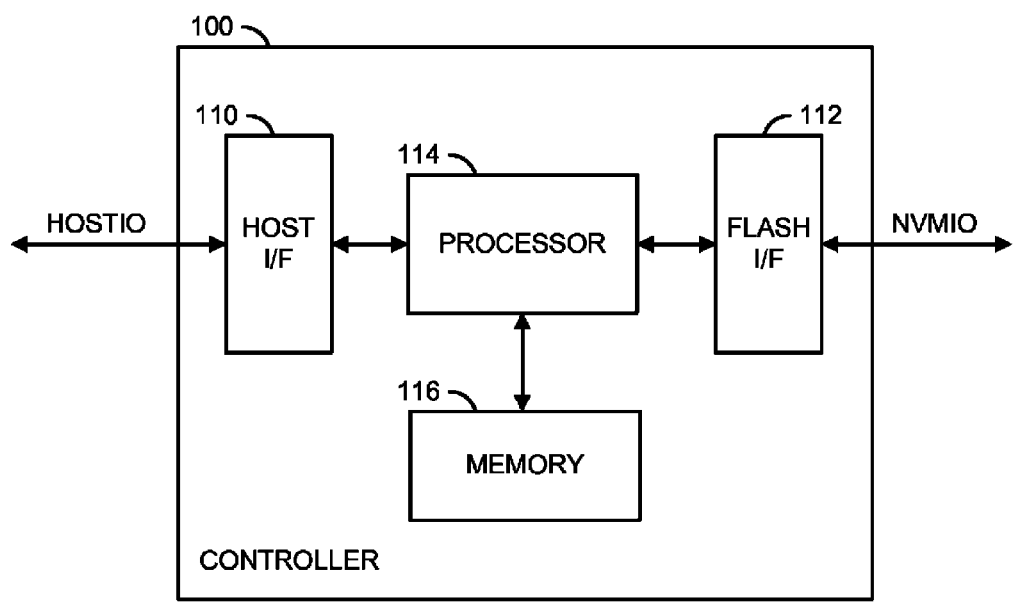
FIG. 2 is a block diagram of a controller circuit in accordance with an embodiment of the invention.

Referring to FIG. 2, a block diagram of an example implementation of the circuit 100 is shown in accordance with an embodiment of the invention. The circuit 100 generally comprises a block (or circuit) 110, a block (or circuit) 112, a block (or circuit) 114 and a block (or circuit) 116. The circuits 110 to 116 may represent modules and/or blocks that may be implemented as hardware, software, a combination of hardware and software, or other implementations.

The circuit 110 is shown implemented as a host interface circuit. The circuit 110 is operational to provide communication with the circuit 92 via the signal HOSTIO. Other signals may be implemented between the circuits 92 and 110 to meet the criteria of a particular application.

The circuit 112 is shown implemented as a nonvolatile memory (e.g., flash) interface circuit. The circuit 112 is operational to provide communication with the circuit 94 via the signal NVMIO. Other signals may be implemented between the circuits 94 and 110 to meet the criteria of a particular application.

The circuit 114 is shown implemented as a processor circuit. The circuit 114 is operational to command and/or assist with the multiple read/write requests and to control one or more reference voltages used in the circuit 94 to read the codewords.

In certain embodiments, the circuit 114 is operational to monitor a number of reads since a respective erase in one or more of the blocks in the circuit 94. A page is moved from a current block to another block in response to the number of reads exceeding an unclosed threshold where the current block is partially programmed. The page is moved from the current block to the other block in response to the number of reads exceeding a closed threshold where the current block is fully programmed. The unclosed threshold is generally less than the closed threshold.

The circuit 116 is shown implemented as a memory circuit. The circuit 116 is operational to buffer codewords received from the circuit 94 via the circuit 112. The circuit 116 is also operational to buffer decoding parameters generated by the circuit 114. Where the read disturb technique is implemented in firmware, the circuit 116 is operation to store in the firmware in a nonvolatile portion of the memory.

Figure 3:
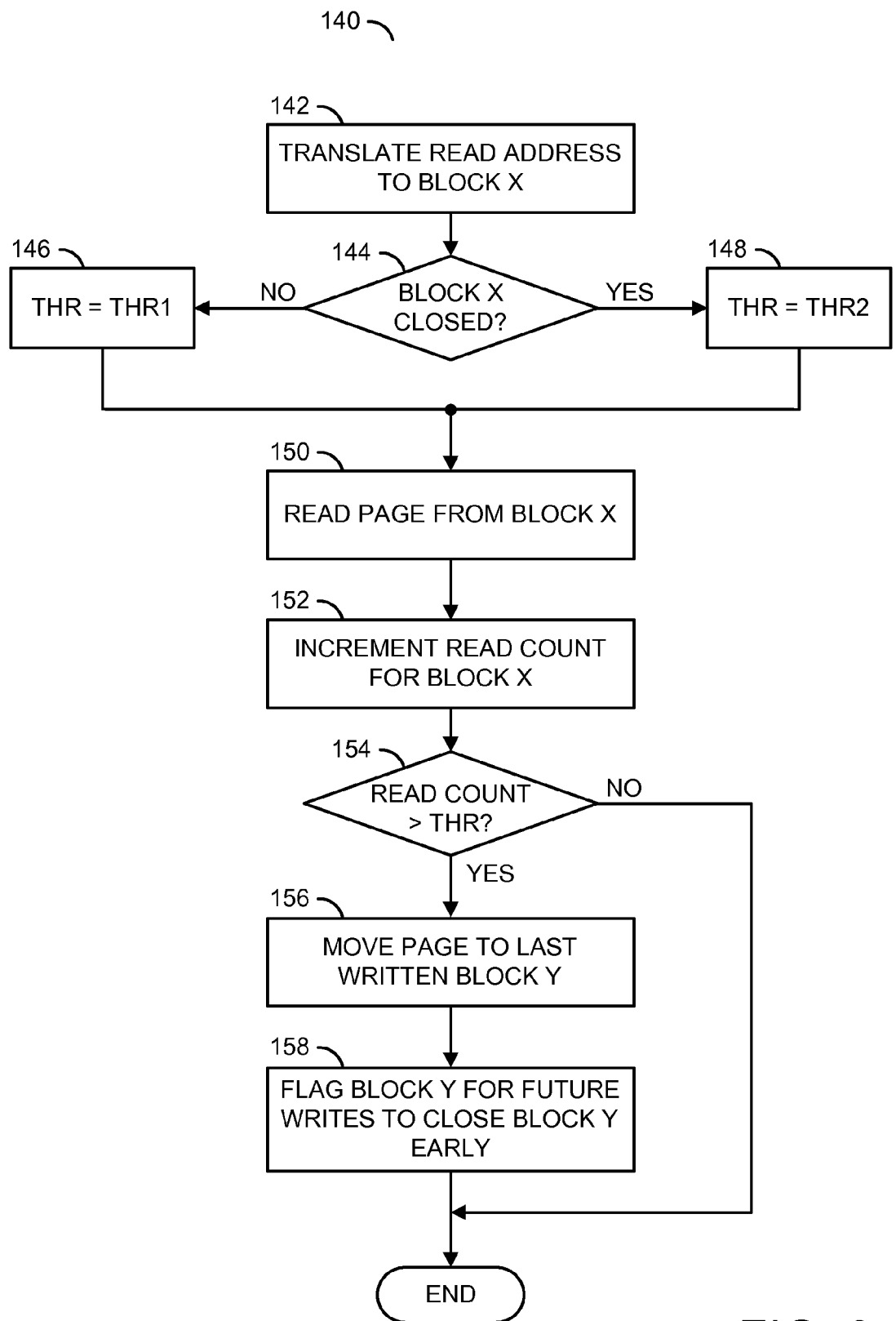
FIG. 3 is a flow diagram of a method to reduce read disturb.

Referring to FIG. 3, a flow diagram of an example implementation of a method 140 to reduce read disturb is shown. The method (or process) 140 is generally implemented in the circuit 100. The method 140 comprises a step (or state) 142, a step (or state) 144, a step (or state) 146, a step (or state) 148, a step (or state) 150, a step (or state) 152, a step (or state) 154, a step (or state) 156 and a step (or state) 158. The steps 142 to 158 may represent modules and/or blocks that may be implemented as hardware, software, a combination of hardware and software, or other implementations. The sequence of the steps is shown as a representative example. Other step orders may be implemented to meet the criteria of a particular application.

In a step 142, the circuit 100 may translate a read address received from the circuit 92 into a physical address. The physical address identifies a particular flash die (or device), a block (e.g., block X) with the flash die and page within the block. A check is made in the step 144 to see if the block being accesses is a fully programmed block or a partially programmed block. Where the block being accessed is not fully programmed (not closed), a threshold value (e.g., THR) is set to an unclosed value (e.g., THR1) in the step 146. Where the block bing access is fully programmed (closed), the threshold value THR is set to a closed value (e.g., THR2) in the step 148. The value THR1 is usually a lower value than the value THR2 since partially programmed blocks are most susceptible to the read disturb than the closed blocks.

In the step 150, the accessed page is read from the block X. A read counter for block X is incremented in the step 152. A comparison is performed in the step 154 between a value of the read count and the threshold THR. If the read count value is greater than the threshold THR, the just-read page is moved to another block (e.g., block Y) in the step 156. In certain embodiment, the block Y is a most recently written to (last written) block in the circuit 94. Other techniques to determine the block Y may be implemented to meet the criteria of a particular application. In the step 158, the block Y is flagged in the circuit 100 for future writes in an effort to close block Y early, thus reducing the read disturb impact caused by the newly acquired hot page.

Figure 4:
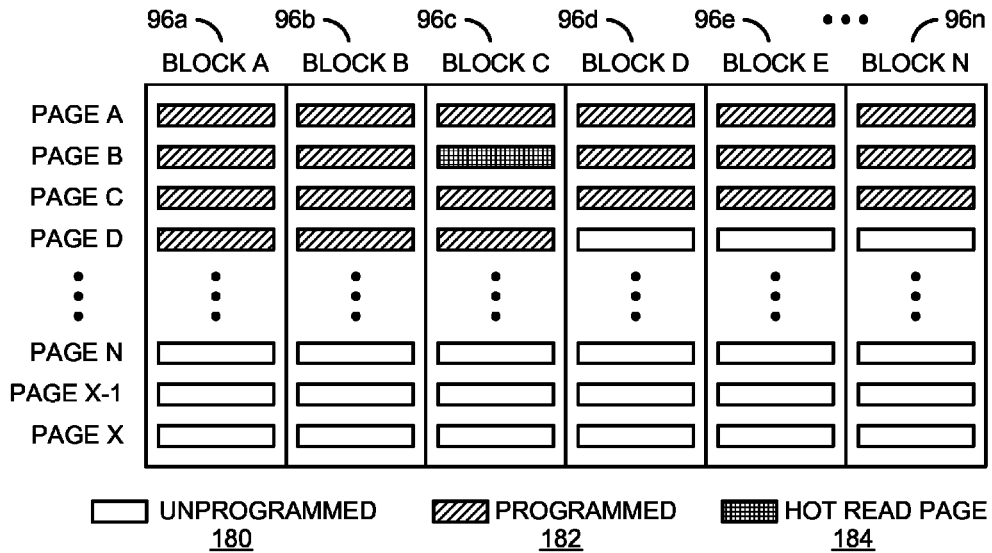
FIG. 4 is a detailed diagram of a flash circuit.

Referring to FIG. 4, a detailed diagram of the circuit 94 is shown. The circuit 94 generally comprises multiple dies (or devices) 96a-96n. Each device 96a-96n is divided into multiple blocks (e.g., Block A-Block N) (only a single block is shown per device 96a-96n for clarity.) Each block A thru block N generally comprises multiple pages (e.g., Page A to Page X). Some of the pages A-X in the example are unprogrammed 180, some of the pages are programmed 182 and a representative hot read page 184 is shown.

The read disturb effect on programmed pages makes the data on the disturbed pages error-prone. In some situations, the disruption can result in uncorrectable errors when reading data from the affected pages. As such, the circuit 100 rewrites the data on the disturbed pages to new data blocks A-N when the read counts of the blocks A-N reach the threshold THR (e.g., THR1 or THR2). The value of the threshold THR1 for a partially programmed block is smaller than the threshold THR2 that on a full programmed block because of the characteristic of NAND. Generally, the state of programmed NAND cells of partially filled blocks are moderately unstable. The instability is a new characteristic of the newer NAND flash memories that are created with more sophisticated manufacturing processes than the older flash devices. In both cases, the threshold THR1 and THR2 are smaller than a refresh count (e.g., THR-RF).

Upon a block A-N reaching the refresh count THR-RF, the entire contents of the block A-N is moved. As to the read disturb effect on the unprogrammed pages 180, the unprogrammed pages 180 pages should be kept in an erased state when the read count on the block A-N reaches certain exposure threshold (e.g., THR-EXP). Such affected unprogrammed pages 180 subjected to THR-EXP read disturbs should not be used to program data anymore. If data is written to the unprogrammed pages 180 after the threshold THR-EXP is reached, uncorrectable error may result.

For a partially programmed block, both the cases of read disturb effect on the programmed pages 182 and eased pages exist. In the example illustrated in FIG. 4, the blocks A-N shown are the last written blocks in the system. The hot read page 184 in block C of device 96c impacts the programmed pages 182 and the unprogrammed pages 180. Continued reads of the hot read page 184 can quickly increase the read count of the die 96c/block C.

Figure 5:
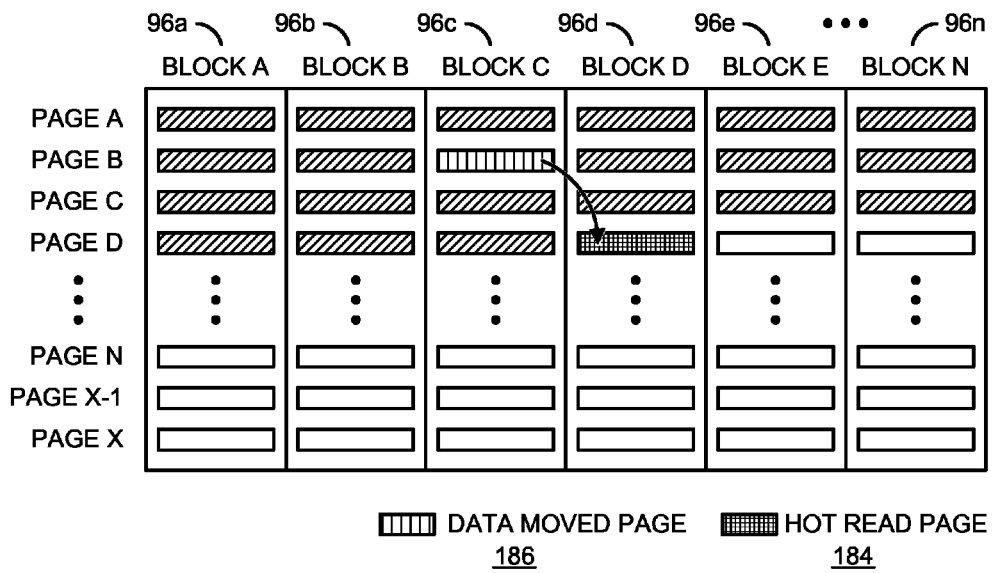
FIG. 5 is a diagram of the flash circuit with a hot read page moved to a different block.

Referring to FIG. 5, a diagram of the device 94 with the hot read page 184 moved to a different block is shown. Usually the read count is managed per physical block A-N for each device 96a-96n. The read count is cleared to zero when a block A-N is erased and starts to increase when page read commands are issued to the block A-N. As shown in the example, the read count of device 96c/block C increases more quickly than other blocks because of the hot read page 184 located in device 96c/block C/page B. To prevent the read count of device 96c/block C from increasing too quickly, the circuit 100 moves the hot read data from device 96c/block C/page B to a different location after a certain number of reads. The move leverages the (low) read count of all the last written blocks A-N and keeps the pages on such blocks A-N in a safe state for a longer time.

In the example illustrated in FIG. 5, the hot read page 184 is moved from device 96c/block C/page B (e.g., data moved page 186) to device 96d/block D/page D (assuming no new host/user data is written into the device 96d/block D during the data movement). The move is essentially a physical page-based data recycling (ore refreshing). After the hot read page 184 has moved, the read count of the device 96c/block C stops increasing as quickly as before because the hot read data 184 is now in the device 96d/block D. With the slower read count rate, the remaining pages on the device 96c/block C stay in the safe state longer. While the read disturb effect on the device 96c/block C is slowed, the read count of device 96d/block D generally increases to a faster rate because the hot read page 184 is now in the device 96d/block D/page D.

When the read count of a block A-N reaches the refresh threshold THR-RF, the block A-N is in a suspicious state. All of the pages are subsequently moved, not just the hot read page 184. Therefore, the unclosed threshold THR1 and the closed threshold THR2 are set to lower read count values than the refresh threshold THR-RF. In certain embodiments, the thresholds THR1 and THR2 are fractions of the refresh threshold THR-RF (e.g., THR-RF/2, THR-RF/10). Other threshold values THR1 and THR2 may be implemented to meet the criteria of a particular application.

Since the read count is counted per block A-N, not per single pages, finding the exact hot read physical page 184 can be challenging. In some embodiments, when the read count of a block A-N has reached the threshold THR1/THR2, the circuit 100 moves each page to a new location when read by the circuit 92. For example, the read count of the device 96c/block C is larger than the threshold THR1, any of the pages in the device 96c/block C is moved to a new location when read by the circuit 92. The moved page may or may not be the hot read page 184, but a probability that the hot read page 184 is being accessed is larger than any other pages. Thus, the probability of moving the device 96c/block C/page B is also larger than any other pages. In various embodiments, the circuit 100 keeps track of the location of one or a few of the hot read pages 184. Movement of a page from one block to another is contingent on the currently-accessed page being one of the tracked hot read pages 184. Therefore, unnecessary movement of infrequently read pages is avoided simply because the read occurs after the block read count exceeds the threshold THR1/THR2.

Figure 6:
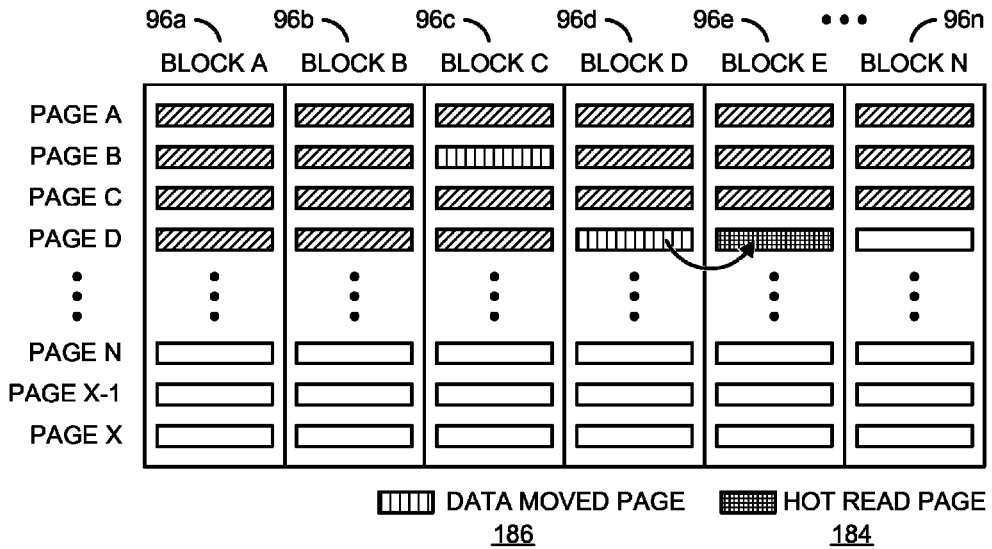
FIG. 6 is a diagram of the flash circuit with the hot read page moved to still a different block.

Referring to FIG. 6, a diagram of the device 94 with the hot read page 184 moved to still a different block is shown. As time goes on, the read count of the device 96d/block D reaches the threshold TH1. When the threshold is reached, the circuit 100 again moves the hot read page 184 to a different block A-N. To simplify the description, no new user data is considered to be programmed during the period.

With the hot read data movement, the count of reading the hot data becomes evenly distributed in several data blocks A-N, instead of accumulated on only a single block (e.g., block C). The distribution generally makes the read count of the data blocks A-N similar and thus minimizes the read disturb effect on a single block A-N.

Figure 7:
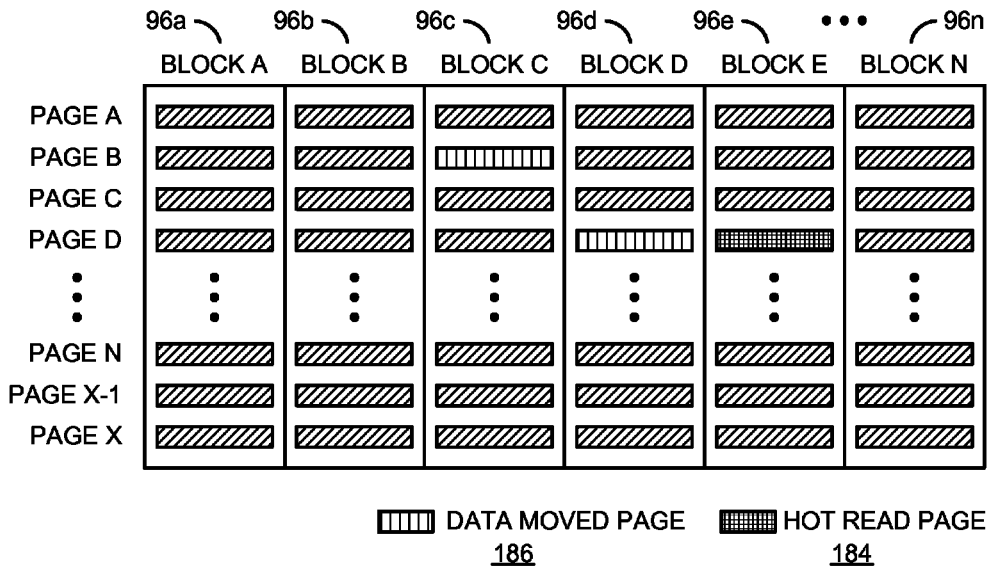
FIG. 7 is a diagram of a last block closed with user data.

Referring to FIG. 7, a diagram of the device 94 with the last block closed with user data is shown. Moving the hot read page 184 from one block to another block reduces the read disturb effect on the original data block (e.g., block C). In real applications, new user data is written to the last blocks A-N at the same time. The last blocks A-N ultimately become fully programmed blocks due to the new user data. The value of threshold THR2 for a full programmed block A-N is larger than the threshold THR1 on partially programmed block A-N. Therefore, the hot read page 184 can stay longer in a safe state in the full programmed block (e.g., block E of the device 96e) than if the block E were partially programmed.

Figure 8:
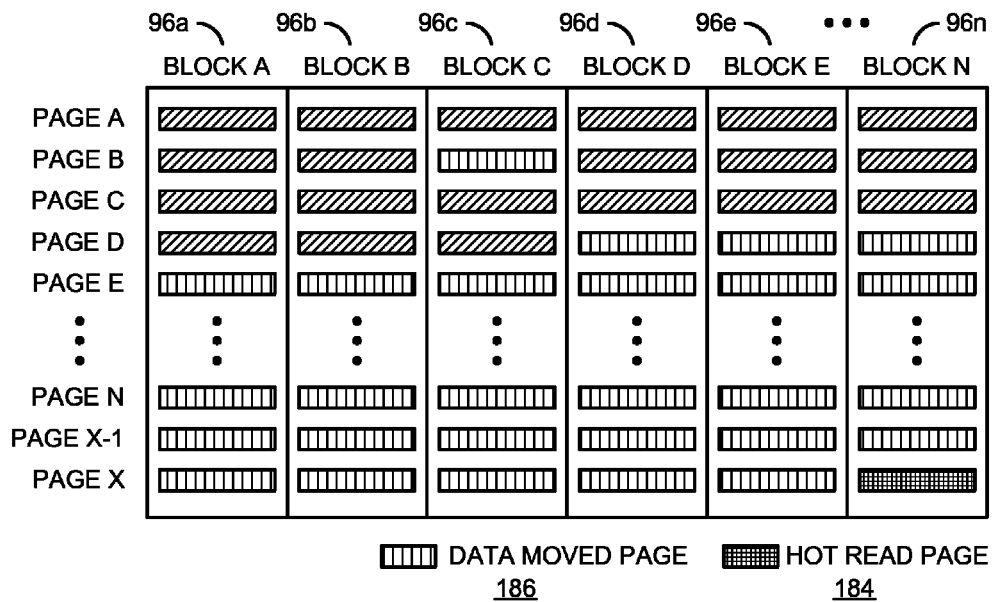
FIG. 8 is a diagram of the last block closed with hot read data.

Referring to FIG. 8, a diagram of the device 94 with the last block closed with hot read data is shown. If the hot read page 184 continuously moves one physical page to another page and from one block to another block, the read count of all data blocks A-N will expire upon reaching the threshold THR-RF. Consider a situation where no new user data written. The hot read page 184 is moved from block to block again and again until all the blocks A-N have hosted the hot read page 184. Therefore, the partially programmed blocks A-N become fully programmed blocks A-N automatically due to the movement of the hot read page 184.

The read count increases caused by reading the hot read page 184 is evenly distributed in several data blocks A-N and the last blocks A-N are ultimately closed so the read disturb effect on the partially programmed blocks is reduced. The method 140 generally increases the free space utilization of the data blocks A-N. Furthermore, the last blocks A-N are closed natively. Various embodiments of the invention set a threshold of partially programmed blocks to move the hot data to another location. As a result, the read count of each block in the last written blocks is dampened by hosting the hot read data only from a short while. Furthermore, the last written blocks are closed natively during the data movement.

The functions performed by the diagrams of FIGS. 1-3 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROM (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. An apparatus comprising:
an interface to a nonvolatile memory having a plurality of blocks; and
a processor configured to (i) monitor a number of reads since a respective erase in at least one of said blocks in said nonvolatile memory, (ii) move a page from a first block to a second block in response to said number of reads exceeding a first threshold where said first block is partially programmed and (iii) move said page from said first block to said second block in response to said number of reads exceeding a second threshold where said first block is fully programmed, wherein said first threshold is less than said second threshold.

2. The apparatus according to claim 1, wherein said second block is a most recently programmed block.

3. The apparatus according to claim 1, wherein said second threshold is less than a third threshold that triggers a refresh of said first block.

4. The apparatus according to claim 1, wherein said processor is further configured to flag said second block to receive future writes.

5. The apparatus according to claim 1, wherein said processor is further configured to move another page from said first block to said second block in response to reading said other page after said move of said page.

6. The apparatus according to claim 1, wherein said second block is in a different integrated circuit than said first block.

7. The apparatus according to claim 1, where said processor is further configured to move said page from said first block to said second block in response to said number of reads exceeding a refresh threshold.

8. The apparatus according to claim 1, wherein said nonvolatile memory comprises NAND flash memory.

9. The apparatus according to claim 1, wherein said processor forms part of a solid-state drive controller.

10. The apparatus according to claim 1, wherein said apparatus is implemented as one or more integrated circuits.

11. A method for handling read disturb in a nonvolatile memory, comprising the steps of:
(A) monitoring a number of reads since a respective erase in at least one of a plurality of blocks in said nonvolatile memory;
(B) moving a page from a first block to a second block in response to said number of reads exceeding a first threshold where said first block is partially programmed; and
(C) moving said page from said first block to said second block in response to said number of reads exceeding a second threshold where said first block is fully programmed, wherein said first threshold is less than said second threshold.

12. The method according to claim 11, wherein said second block is a most recently programmed block.

13. The method according to claim 11, wherein said second threshold is less than a third threshold that triggers a refresh of said first block.

14. The method according to claim 11, further comprising the step of:
flagging said second block to receive future writes.

15. The method according to claim 11, further comprising the step of:
moving another page from said first block to said second block in response to reading said other page after said move of said page.

16. The method according to claim 11, wherein said second block is in a different integrated circuit than said first block.

17. The method according to claim 11, further comprising the step of:
moving said page from said first block to said second block in response to said number of reads exceeding a refresh threshold.

18. An apparatus comprising:
a nonvolatile memory having a plurality of blocks; and
a controller configured to (i) monitor a number of reads since a respective erase in at least one of said blocks in said nonvolatile memory, (ii) move a page from a first block to a second block in response to said number of reads exceeding a first threshold where said first block is partially programmed and (iii) move said page from said first block to said second block in response to said number of reads exceeding a second threshold where said first block is fully programmed, wherein said first threshold is less than said second threshold.

* * * * *